United States Patent
Ang et al.

(10) Patent No.: US 10,721,044 B2
(45) Date of Patent: Jul. 21, 2020

(54) DOWNLINK CONTROL AND RETRANSMISSION INDICATOR CHANNEL FOR RELAXING ACK PROCESSING TIME CONSTRAINTS

(71) Applicant: QUALCOMM Incorporated, San Diego, CA (US)

(72) Inventors: Peter Pui Lok Ang, San Diego, CA (US); Jing Jiang, San Diego, CA (US); Krishna Kiran Mukkavilli, San Diego, CA (US); Tingfang Ji, San Diego, CA (US); John Edward Smee, San Diego, CA (US); Jamie Menjay Lin, San Diego, CA (US); Rotem Cooper, San Diego, CA (US); Michael Alexander Howard, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 15/070,694

(22) Filed: Mar. 15, 2016

(65) Prior Publication Data

US 2017/0272224 A1   Sep. 21, 2017

(51) Int. Cl.
*H04L 5/00* (2006.01)
*H04L 1/00* (2006.01)
(Continued)

(52) U.S. Cl.
CPC ......... *H04L 5/0051* (2013.01); *H04L 1/008* (2013.01); *H04L 1/1671* (2013.01);
(Continued)

(58) Field of Classification Search
CPC ..... H04L 5/0051; H04L 1/0025; H04L 1/008; H04L 1/1887; H04L 5/0053; H04L 5/0044; H04L 1/1671; H04L 1/1896
(Continued)

(56) References Cited

U.S. PATENT DOCUMENTS

2009/0219875 A1* 9/2009 Kwak ............ H04B 7/2615
370/329
2012/0057545 A1   3/2012 Hariharan et al.
(Continued)

FOREIGN PATENT DOCUMENTS

WO    WO-2016130362 A1    8/2016

OTHER PUBLICATIONS

International Search Report and Written Opinion—PCT/US2017/018515—ISA/EPO—dated May 4, 2017.

*Primary Examiner* — Ricky Q Ngo
*Assistant Examiner* — Ellen A Kirillova
(74) *Attorney, Agent, or Firm* — Liem T. Do

(57) ABSTRACT

Systems and methods are disclosed for minimizing latency between receipt of a NACK at a base station from a user equipment (UE) and retransmission of data to the UE. Time constraints for processing the ACK/NACK are relaxed so the base station can decode the ACK/NACK to determine whether a NACK has been received and then prepare for transmission of the appropriate data to the UE in the immediately following transmission time interval (TTI). These constraints are relaxed by separating download data indicator (DDI) from the PDCCH control data and delaying transmission of the DDI until decoding of the ACK/NACK.

88 Claims, 9 Drawing Sheets

(51) Int. Cl.
*H04L 1/18* (2006.01)
*H04L 1/16* (2006.01)

(52) U.S. Cl.
CPC .......... *H04L 1/1887* (2013.01); *H04L 1/1896* (2013.01); *H04L 5/0044* (2013.01); *H04L 5/0053* (2013.01); *H04L 1/0025* (2013.01); *H04L 1/0031* (2013.01); *H04L 5/0055* (2013.01)

(58) Field of Classification Search
USPC ....................................................... 370/329
See application file for complete search history.

(56) References Cited

U.S. PATENT DOCUMENTS

| | | | |
|---|---|---|---|
| 2014/0219206 A1* | 8/2014 | Han | H04L 1/06 370/329 |
| 2014/0245095 A1* | 8/2014 | Nammi | H04L 1/1845 714/749 |
| 2015/0043480 A1* | 2/2015 | Lee | H04L 5/0055 370/329 |
| 2015/0139158 A1* | 5/2015 | Wengerter | H04W 72/0413 370/329 |

* cited by examiner

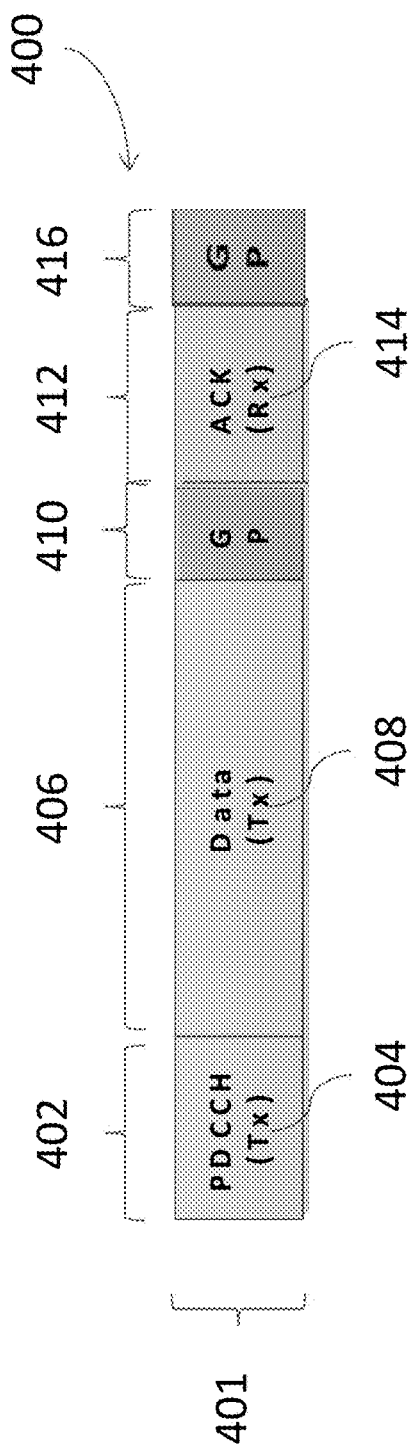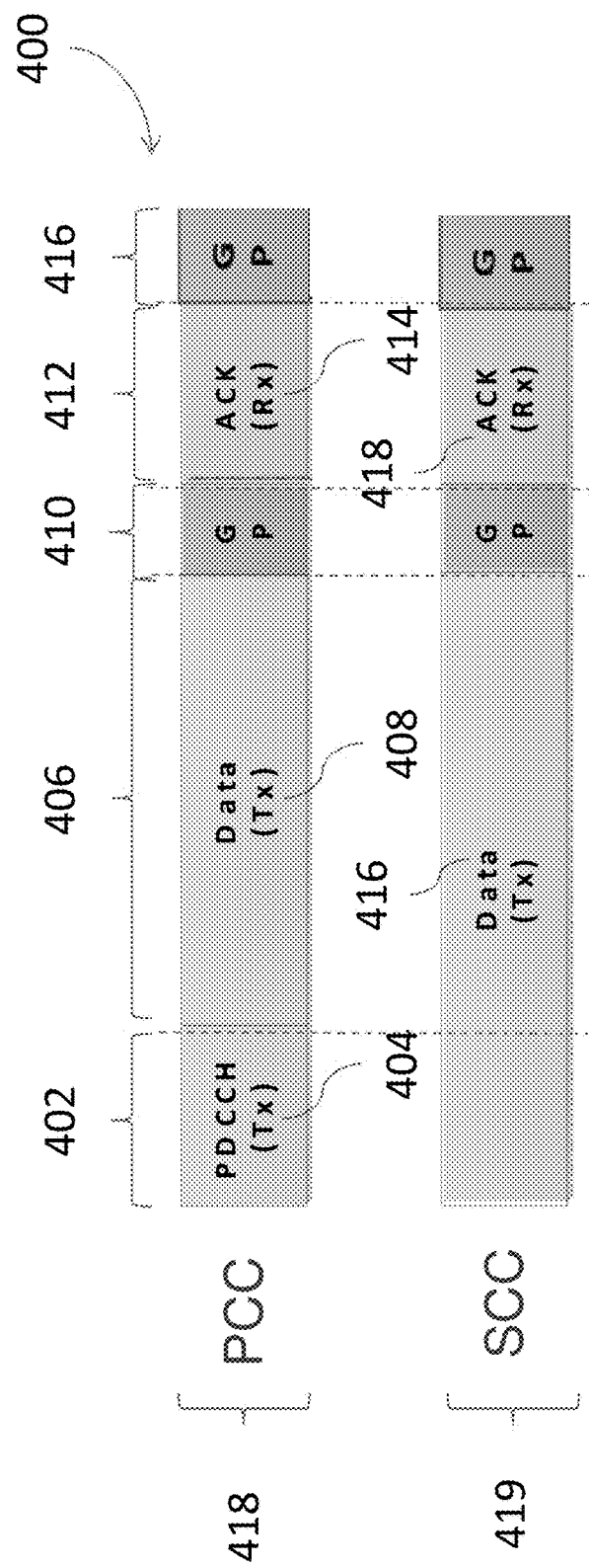
FIG. 4A
FIG. 4B

DOWNLINK CONTROL AND RETRANSMISSION INDICATOR CHANNEL FOR RELAXING ACK PROCESSING TIME CONSTRAINTS

TECHNICAL FIELD

This application relates to wireless communications systems, and in particular to relaxing the time constraints on decoding ACK signals to allow reaction to an ACK or NACK.

BACKGROUND

Wireless communications, in particular cellular communications, are an increasingly important part of daily life, and users of wireless communication devices expect fast and flawless transmission of information. Reducing the latency between transmissions is therefore desirable. A large bottleneck in the latency of wireless communications is retransmission of data in the event that a transmission fails due to interference in the physical channel.

In conventional systems, a base stations and user equipments (UEs), upon receipt of data from a transmitting device, send in return an Acknowledged (ACK) or Not Acknowledged (NACK) signal to let the transmitting device know whether the data was received successfully or not. If the transmitting device receives an ACK, it proceeds to transmit new data. If it receives a NACK, it must retransmit the data until the receiving device successfully receives the data. However, it takes time for a device to process the ACK/NACK signal, which introduces latency into the retransmission process. In some of these systems, the base station or UE is given multiple transmission time intervals (TTIs) to decode a received ACK/NACK signal and discover whether it needs to retransmit the previous TTI's data. It is therefore desirable to reduce this latency, and is ideal to retransmit data in the TTI immediately following receipt of a NACK signal.

SUMMARY

In one aspect of the invention, a method of wireless communication includes transmitting, from a first wireless communication device to a second wireless communication device, a first downlink control waveform that does not include downlink data indicators during a first symbol period of a transmission time interval (TTI); transmitting, from the first wireless communication device to the second wireless communication device, a second downlink control waveform including downlink data indicators during a second symbol period of the TTI, the second symbol period being different than the first symbol period; and transmitting, from the first wireless communication device to the second wireless communication device, data waveforms in accordance with the first and second downlink control waveforms.

In an additional aspect of the invention, a method of wireless communication includes receiving, at a first wireless communication device from a second wireless communication device, a first downlink control waveform that does not include downlink data indicators during a first symbol period of a transmission time interval (TTI); receiving, at the first wireless communication device from the second wireless communication device, a second downlink control waveform including downlink data indicators during a second symbol period of the TTI, the second symbol period being different than the first symbol period; and receiving, at the first wireless communication device from the second wireless communication device, data waveforms in accordance with the first and second downlink control waveforms.

In an additional aspect of the invention, a first wireless communication device includes a transceiver configured to transmit to a second wireless communication device a first downlink control waveform that does not include downlink data indicators during a first symbol period of a transmission time interval (TTI); the transceiver further configured to transmit to the second wireless communication device a second downlink control waveform including downlink data indicators during a second symbol period of the TTI, the second symbol period being different than the first symbol period; and the transceiver further configured to transmit to the second wireless communication device data waveforms in accordance with the first and second downlink control waveforms.

In an additional aspect of the invention, a first wireless communication device includes a transceiver configured to receive, at a first wireless communication device from a second wireless communication device, a first downlink control waveform that does not include downlink data indicators during a first symbol period of a transmission time interval (TTI); the transceiver further configured to receive, at the first wireless communication device from the second wireless communication device, a second downlink control waveform including downlink data indicators during a second symbol period of the TTI, the second symbol period being different than the first symbol period; and the transceiver further configured to receive, at the first wireless communication device from the second wireless communication device, data waveforms in accordance with the first and second downlink control waveforms.

In an additional aspect of the invention, a first wireless communication device includes means for transmitting to a second wireless communication device a first downlink control waveform that does not include downlink data indicators during a first symbol period of a transmission time interval (TTI); means for transmitting to the second wireless communication device a second downlink control waveform including downlink data indicators during a second symbol period of the TTI, the second symbol period being different than the first symbol period; and means for transmitting to the second wireless communication device data waveforms in accordance with the first and second downlink control waveforms.

In an additional aspect of the invention, a first wireless communication device includes means for receiving, at a first wireless communication device from a second wireless communication device, a first downlink control waveform that does not include downlink data indicators during a first symbol period of a transmission time interval (TTI); means for receiving, at the first wireless communication device from the second wireless communication device, a second downlink control waveform including downlink data indicators during a second symbol period of the TTI, the second symbol period being different than the first symbol period; and means for receiving, at the first wireless communication device from the second wireless communication device, data waveforms in accordance with the first and second downlink control waveforms.

In an additional aspect of the invention, a computer-readable medium having program code recorded thereon includes code for causing a first wireless communication device to transmit to a second wireless communication device a first downlink control waveform that does not include downlink data indicators during a first symbol period of a transmission time interval (TTI); code for causing the first wireless communication device to transmit to the second wireless communication device a second downlink control waveform including downlink data indicators during a second symbol period of the TTI, the second symbol period being different than the first symbol period; and code for causing the first wireless communication device to transmit to the second wireless communication device data waveforms in accordance with the first and second downlink control waveforms.

In an additional aspect of the invention, a computer-readable medium having program code recorded thereon includes code for causing a first wireless communication device to receive, from a second wireless communication device, a first downlink control waveform that does not include downlink data indicators during a first symbol period of a transmission time interval (TTI); code for causing a first wireless communication device to receive, from a second wireless communication device, a second downlink control waveform including downlink data indicators during a second symbol period of the TTI, the second symbol period being different than the first symbol period; and code for causing a first wireless communication device to receive, from a second wireless communication device, data waveforms in accordance with the first and second downlink control waveforms.

BRIEF DESCRIPTION OF THE DRAWINGS

FIG. 4A is a block diagram illustrating an embodiment of a cellular downlink transmission time interval in accordance with various aspects of the present disclosure.

FIG. 4B is a block diagram illustrating an embodiment of a cellular downlink transmission time interval in accordance with various aspects of the present disclosure.

DETAILED DESCRIPTION

Figure 1:
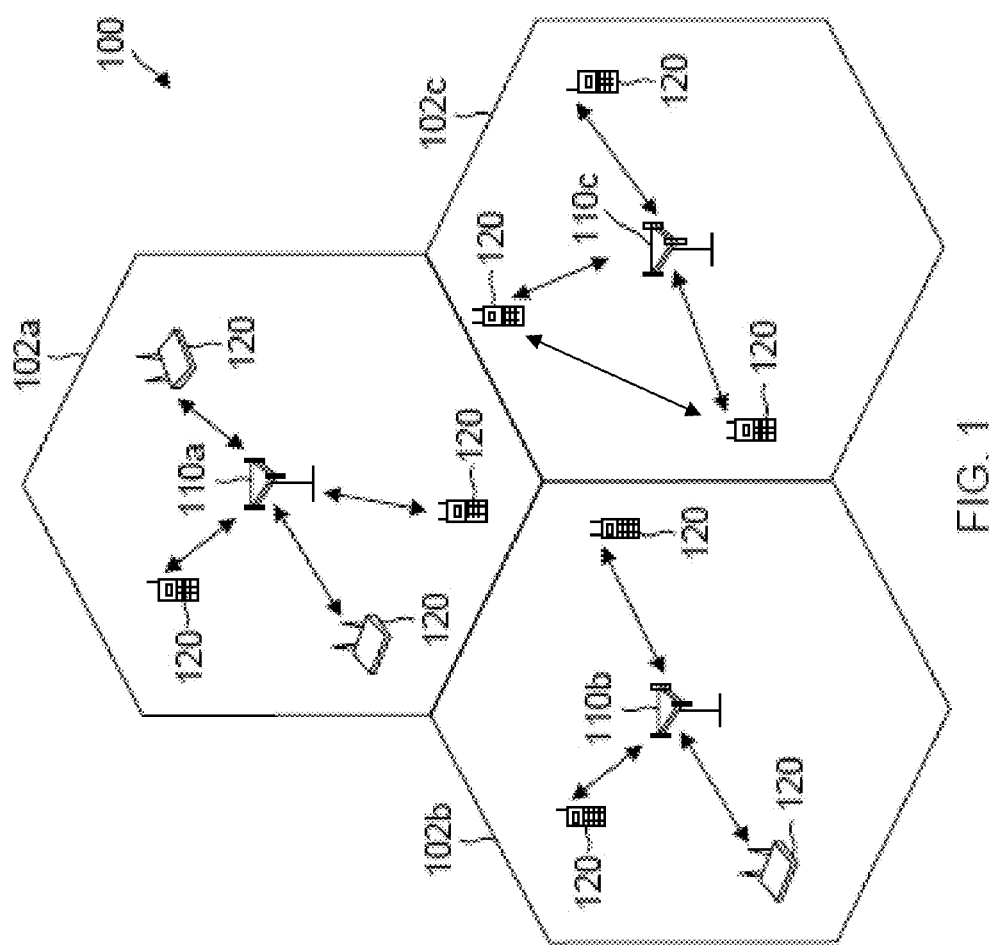
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be applied to networks using various architectures such as Multiple-Input Multiple-Output (MIMO), Single-Input Single-Output (SISO), Multiple-Input Single-Output (MISO), Single-Input Multiple-Output (SIMO), etc. The techniques described herein may be used for the wireless networks and radio technologies mentioned above as well as other wireless networks and radio technologies, such as a next generation (e.g., $5^{th}$ Generation (5G)) network.

Embodiments of the present disclosure describe a system for relaxing the time constraints on a base station for processing an ACK/NACK signal from a user equipment (UE) while minimizing latency between retransmission of data in the event that the UE failed to receive data.

In an embodiment, this is accomplished by separating control data that is related to the type of data to be sent in the next subframe from the rest of the necessary control data. The control data that is related to the type of data to be sent may be delayed while the base station transmits the rest of the control data. During this time the base station may continue to process the ACK/NACK signal and determine whether it is an ACK or a NACK. Once that is determined, the base station may transmit the remaining control data to inform the UE that it will either be receiving new data (in the case of an ACK) or a re-transmission of old data (in the case of a NACK).

In some embodiments, this relaxing the time constraints for processing the ACK/NACK is accomplished similar to above, but new data is sent to the UE while the base station continues to process the ACK/NACK signal. When the base station finishes processing the ACK/NACK signal, it transmits the remaining control data to the UE to inform it that it will either continue to receive new data (in the case of an ACK) or that it should abort receiving the new data and begin receiving a re-transmission of old data (in the case of a NACK).

FIG. 1 illustrates a wireless communication network 100 in accordance with various aspects of the present disclosure. The wireless network 100 may include a number of base stations 110. A base station 110 may include an evolved Node B (eNodeB) in the LTE context, for example. A base station may also be referred to as a base transceiver station or an access point. For simplicity of discussion, it will be referred to herein as a base station. It will be recognized that there could be one to many base stations, as well as be an assortment of different types such as macro, pico, and/or femto base stations.

The base stations 110 communicate with user equipment (UEs) 120 as shown. As shown in FIG. 1, base station 110a may communication with the UEs 120 that are within the cell 102a, the base station 110b may communicate with the UEs 120 within the cell 102b, and the base station 102c may communicate with the UEs 120 within the cell 102c. A UE 120 may communicate with a base station 110 via an uplink and a downlink. The downlink (or forward link) refers to the communication link from a base station 110 to a UE 120. The uplink (or reverse link) refers to the communication link from a UE 120 to a base station 110. In some embodiments, a UE 120 may communicate with another UE 120.

The UEs 120 may be dispersed throughout the wireless network 100, and each UE 120 may be stationary or mobile. A UE may also be referred to as a terminal, a mobile station, a subscriber unit, etc. A UE 120 may be a cellular phone, a smartphone, a personal digital assistant, a wireless modem, a laptop computer, a tablet computer, an internet of everything (IOE) device, etc., to name just a few examples. The wireless communication network 100 is one example of a network to which various aspects of the disclosure apply.

Figure 2:
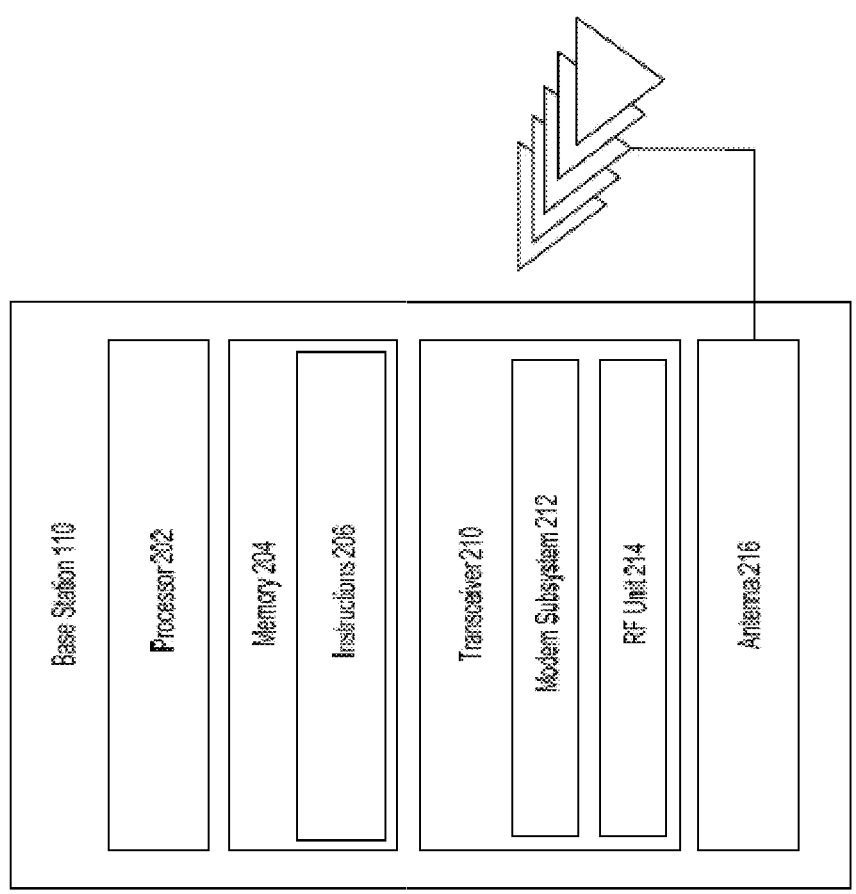
FIG. 2 is a block diagram illustrating an exemplary base station in accordance with various aspects of the present disclosure.

FIG. 2 is a block diagram of an exemplary base station 110 according to embodiments of the present disclosure. The base station 110 may include a processor 202, a memory 204, a transceiver 210, and an antenna 216. These elements may be in direct or indirect communication with each other, for example via one or more buses. As mentioned above with respect to FIG. 1, the base station 110 may communicate with multiple UEs 120 and/or LP IOEs 130.

The processor 202 may include a CPU, a DSP, an ASIC, a controller, a FPGA device, another hardware device, a firmware device, or any combination thereof configured to perform the operations described herein with reference to the base station 110 introduced in FIG. 1 above. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the base station 110 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The transceiver 210 may include a modem subsystem 212 and a radio frequency (RF) unit 214. The transceiver 210 is configured to communicate bi-directionally with other devices, such as one or more UEs 120. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The RF unit 214 may be configured to process (e.g., perform analog to digital conversion or digital to analog conversion, etc.) modulated/encoded data from the modem subsystem 212 (on outbound transmissions) or transmissions originating from another source such as a UE 120. Although shown as integrated together in transceiver 210, the modem subsystem 212 and the RF unit 214 may be separate devices that are coupled together at the base station 110 to enable the base station 110 to communicate with other devices.

The RF unit 214 may provide the modulated and/or processed data, e.g. data packets, to the antenna 216 for transmission to one or more other devices such as UEs 120. The RF unit 214 may receive the modulated and/or encoded data packet and process the data packet prior to passing it on to the antenna 216. This may include, for example, transmission of data messages to one or more UEs 120 according to embodiments of the present disclosure. The antenna 216 may further receive data messages transmitted from a UE 120, and provide the received data messages for processing and/or demodulation at the transceiver 210. As illustrated, the antenna 216 may include multiple antennas of similar or different designs in order to sustain multiple transmission links.

Figure 3:
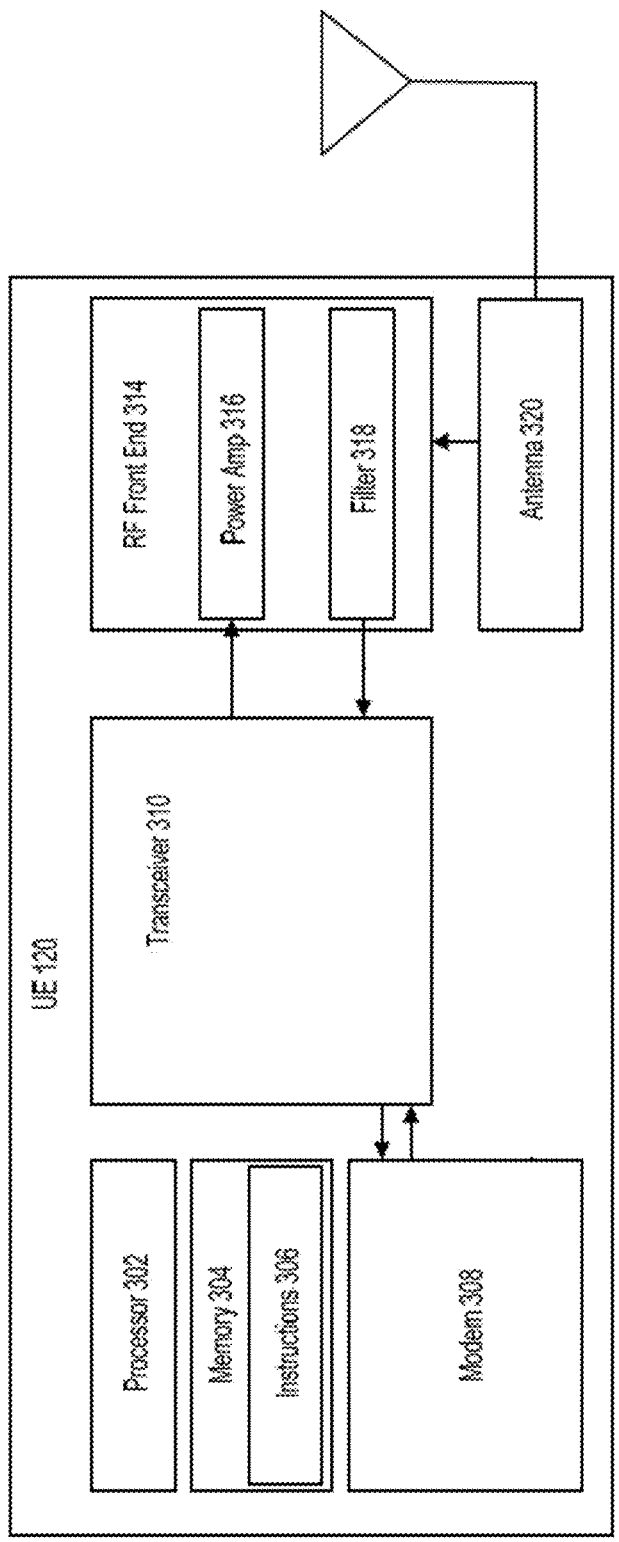
FIG. 3 is a block diagram illustrating an exemplary user equipment or internet of everything device in accordance with various aspects of the present disclosure.

FIG. 3 is a block diagram of an exemplary UE 120 according to embodiments of the present disclosure. The UE 120 may include a processor 302, a memory 304, a modem 308, a transceiver 310, an RF front end 314, and an antenna 320. These elements may be in direct or indirect communication with each other, for example via one or more buses. As mentioned above with respect to FIG. 1, the UE 120 may communicate with a base station 110 that is within range.

The processor 302 may include a CPU, a DSP, an ASIC, a controller, a FPGA device, another hardware device, a firmware device, or any combination thereof configured to perform the operations described herein with reference to the UE 120 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UE 120 in connection with embodiments of the present disclosure. Instructions 306 may also be referred to as code, which may be interpreted broadly to include any type of computer-readable statement(s) as discussed above with respect to FIG. 2.

The modem subsystem 308 may be configured to modulate and/or encode data according to a modulation and coding scheme (MCS), e.g., a low-density parity check (LDPC) coding scheme, a turbo coding scheme, a convolutional coding scheme, etc.

The transceiver 310 may include a transmitter and a receiver and any other components to allow transmission and reception of data, for example to process (e.g., perform analog to digital conversion or digital to analog conversion, etc.) modulated/encoded data from the modem subsystem 308 (on outbound transmissions) or transmissions originating from another source such as a UE 120. For the transmitter, this may include digital to analog conversion, a local oscillator, and upconversion of baseband signals to the selected transmission frequency, to name just a few examples. For the receiver, this may include a down converter to put the received signal at baseband, a baseband filter, and an analog-to-digital converter to name a few examples.

The RF front end 314 may include a filter 318, which may be for example a band-pass filter to filter out-of-band signals. The RF front end 314 may also include an impedance matching circuit and an amplifier 316. Although illustrated as separate, as will be recognized some aspects described above with respect to the transceiver 310 may be performed by the RF front end 314 (e.g., upconversion, downconversion, and mixing) and vice versa. The RF front end 314 may provide the modulated and/or processed data, e.g. data packets, to the antenna 320 for transmission to the base station 110.

The antenna 320 may include one or multiple antennas of similar or different designs in order to sustain a single or multiple transmission links, respectively. The antenna 320 of the UE 120 may transmit data provided from the transceiver 310 after modulation and coding from the modem subsystem 308 and amplification at the RF front end 314. The antenna 320 of the UE 120 may also receive data from multiple sources, including from a base station 110. The antenna 320 may feed the received data to the RF front end 314.

FIG. 4A is a block diagram illustrating an embodiment of a cellular downlink transmission time interval (TTI) 400, also known as a sub-frame (SF). In this embodiment, during the downlink TTI 400 a base station 110 is transmitting to a UE 120 in a single carrier frequency 401. During time period 402 control data 404 is transmitted to the UE 120, containing the information necessary for the UE 120 to know what to expect to receive for the rest of the TTI 400. In some embodiments, the control data 404 is carried on a Physical Downlink Control Channel (PDCCH). In some embodiments, the carrier frequency 401 may be very wideband, and the control data 404 may not need to span the entirety of the bandwidth of carrier frequency 401. This may provide various advantages such as, for example, reducing control signal overhead, and allowing narrowband operation of a receiving UE 120 that is only monitoring a control channel (e.g., an idle UE 120). This embodiment is further illustrated below with respect to FIG. 5. Next, during time period 406 data 408 is transmitted to the UE 120. In some embodiments, data 408 is carried on a Physical Downlink Shared Channel (PDSCH). In some embodiments, other signals such as pilot signals, channel-state information reference signals (CSI-RS) and the like may also be transmitted during the during time period 406. After the base station 110 finishes transmission of all necessary signals during time period 406, there is a guard period (GP) 410 that allows time for the base station 110 to switch from transmission mode to reception mode, and for propagation of signals to and from the UE 120. After the guard period 410, during time period 412, the base station 110 receives an Acknowledged (ACK) or Not Acknowledged (NACK) symbol 414 from the UE 120. An ACK indicates that the UE 120 successfully received the signals transmitted by the base station 110 during the time periods 402 and 406, while a NACK indicates that the signals were not received successfully. In some embodiments, the UE 120 may also transmit other signals such as Physical Uplink Control Channel (PUCCH), Random Access Channel (RACH), Scheduling Request (SR) and Sounding Reference Signal (SRS) during time period 412 as necessary. After receipt of the ACK or NACK, there is another guard period (GP) 416 that allows time for the base station 110 to switch from reception to transmission mode for the next TTI. Time periods 410, 412 and 416 may occupy an amount of symbol periods of the TTI 400, including portions of one or more symbol periods, slots, sub-slots, or other time division of the TTI 400. The next TTI then begins after the guard period 416.

The ACK and NACK signals trigger the base station 110's next action. If the base station 110 receives an ACK from UE 120, then it may transmit new data to the UE 120 in the next TTI. However, if the base station 110 receives a NACK from UE 120, it needs to retransmit the data to the UE 120 until it receives an ACK from the UE 120. Ideally this is done with minimum latency, i.e. the data is retransmitted in the TTI that immediately follows receipt of the NACK signal. To achieve minimum latency, the base station 110 must therefore know whether to transmit new data or to retransmit the previous TTI's data before the next TTI begins. In some embodiments, this is accomplished by separating from the control data (PDCCH) the portion of the control data that is related to the type of data to be sent. The portion that is related to the type of data to be sent may be referred to as Downlink Data Indicators (DDI). The DDI may refer to the Physical Downlink Data Indicator Channel (PDDICH). In some embodiments, the PDDICH may contain some or all of the Modulation and Coding Scheme (MCS), New Data Indicator (NDI), and Redundancy Version (RV) signals. In other embodiments, both the PDDICH and the PDCCH may contain the MCS, as will be further described below. The PDDICH may be delayed until after the PDCCH is transmitted by the base station 110 to the UE 120, thereby allowing the base station 110 to continue processing the ACK/NACK signal during transmission of the PDCCH.

FIG. 4B is a block diagram illustrating an embodiment of a cellular downlink transmission time interval (TTI) 400. In this embodiment, during the downlink TTI 400 a base station 110 is transmitting to a UE 120 using a carrier aggregation (CA) scheme with cross-carrier control information. In a CA scheme using cross-carrier control information, a control channel in one component carrier may contain control information pertaining to other component carriers.

In this embodiment, primary component carrier (PCC) 418 functions similarly to carrier frequency 401 of FIG. 4A. For example, control data 404 may carried on a PDCCH and transmitted during time period 402. Data 408 may be carried on a PDSCH and transmitted during time period 406, along with other signals such as pilot signals, CSI-RS, and the like. A GP 410 may follow time period 406 to allow time for the base station 110 to switch from transmission mode to reception mode, and for propagation of signals to and from the UE 120. After the GP 410, during time period 412, the base station 110 may receive an ACK or NACK symbol 414 from the UE 120. After receipt of the ACK or NACK, there may be another GP 416 to allow time for the base station 110 to switch from reception to transmission mode for the next TTI.

In addition to PCC 418, one or more secondary component carriers (SCCs) 419 may be used by base station 110 to transmit further information to UE 120 during the TTI 400. For example, the base station 110 may transmit data 416 to the UE 120 on an SCC 419 during time periods 402 and 406. In some embodiments, data 416 is carried on a Physical Downlink Shared Channel (PDSCH), similar to data 408 carried on the PCC 418. No control data is carried on SCC 419. Instead, the control data 404 that is carried on PCC 418 may also contain the information necessary for the UE 120 to know what to expect to receive for the rest of the TTI 400 on SCC 419. A GP 410 may follow time period 406 to allow time for the base station 110 to switch from transmission mode to reception mode, and for propagation of signals to and from the UE 120. After the guard period 410, during time period 412, the base station 110 may receive an ACK or NACK symbol 414 on SCC 419 from the UE 120. After receipt of the ACK or NACK, there may be another GP 416 to allow time for the base station 110 to switch from reception to transmission mode for the next TTI. Although only one SCC 419 is illustrated, it is understood that multiple SCCs 419 may be used during TTI 400 in a similar manner, with control data for the multiple SCCs 419 carried on the PCC 418.

Figure 5:
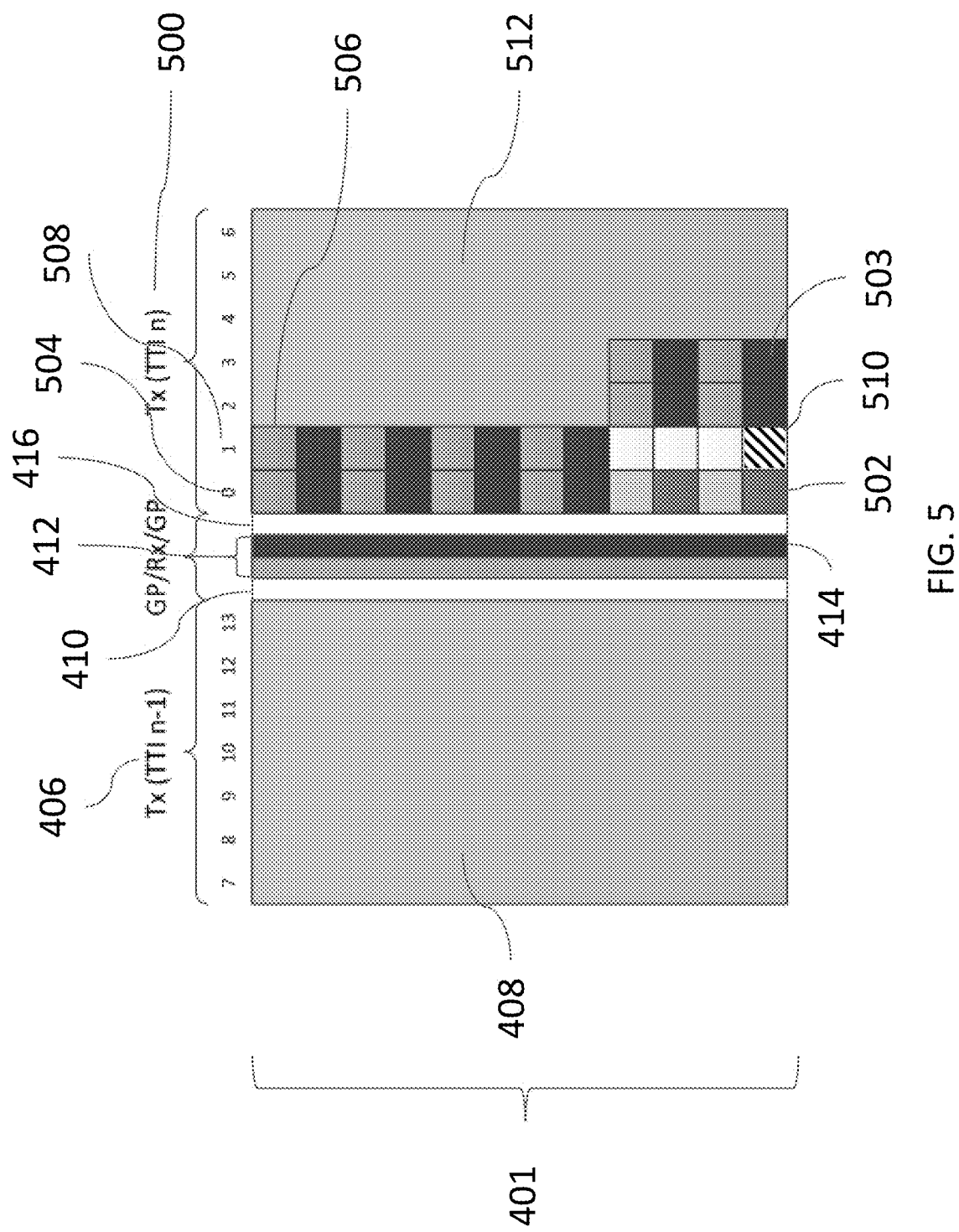
FIG. 5 is a block diagram illustrating an embodiment of a downlink transmission using two control channels to achieve a relaxed ACK/NACK processing time constraint in accordance with various aspects of the present disclosure.

FIG. 5 is a block diagram illustrating an embodiment of a downlink transmission using two control channels to achieve a relaxed ACK/NACK processing time constraint. As noted above with respect to FIG. 4A, this embodiment may use a very wideband single carrier 401. After the end of time period 406 of TTI 400, which may be referred to as the transmit portion of $TTI_{n-1}$, the base station 110 enters guard period 410, then receives ACK/NACK signal 414 during time period 412, then enters guard period 416. During the time periods 410, 412, and 416, the base station 110 may prepare a PDCCH 502 that contains control information except for the DDI, as it does not need knowledge of the ACK or NACK to do so. Meanwhile, the base station 110 may begin to process the ACK/NACK signal 414 as soon as it begins receiving it. In the first symbol period 504 of the next TTI 500, which may be referred to as $TTI_n$, the base station 110 allocates one or more resource elements (REs) 506 to the PDCCH 502. As noted above with respect to FIG. 4A, the PDCCH 502 may not occupy the entirety of the bandwidth of carrier 401 during symbol period 504 (e.g, the PDCCH 502 may not occupy all REs 506 of carrier 401 during symbol period 504). PDCCH 502 in this embodiment does not include the MCS, NDI, or RV. In this embodiment, 4 layers (i.e. 4 antenna ports) are used, each of which requires a pilot signal. This embodiment also uses full density pilot signals. Due to the wideband nature of carrier 401, pilot signals 503 may occupy the remaining REs 506 of symbol period 504, and may overflow into further symbol periods. During symbol period 504 the base station 110 may continue to process the ACK/NACK signal 414. The base station 110 will finish decoding the ACK/NACK signal 414 by the beginning of symbol period 508. At this point, base station 110 will have decoded the ACK/NACK signal 414 and know whether it needs to retransmit data 408 (i.e., a NACK was received) or transmit new data in resource block (RB) 512 (i.e., an ACK was received). In some embodiments, if an ACK was received but there is no new data to transmit, the base station 110 may retransmit data 408 anyway in case the ACK was a false positive. Using this information, the base station 110 constructs PDDICH 510. During symbol period 508 the base station 110 allocates one or more REs 506 to the PDDICH 510. Similar to the PDCCH 502 described above, when carrier 401 is a very wideband carrier the PDDICH 510 may not occupy the entirety of the bandwidth of carrier 401 during symbol period 508. In this embodiment, PDDICH 510 contains the MCS, NDI and RV. Similar to the PDCCH 502 described above, when carrier 401 is a very wideband carrier the PDDICH 510 may not occupy the entirety of the bandwidth of carrier 401 during symbol period 508. Accordingly, other signals such as pilot signals 503 may occupy the remaining REs 506 of symbol period 508. After the PDDICH 510 has been sent, the UE 120 is prepared to receive data in RB 512, so the base station 110 may begin transmitting data in RB 512 in subsequent symbol periods until the end of TTI 500.

Figure 6:
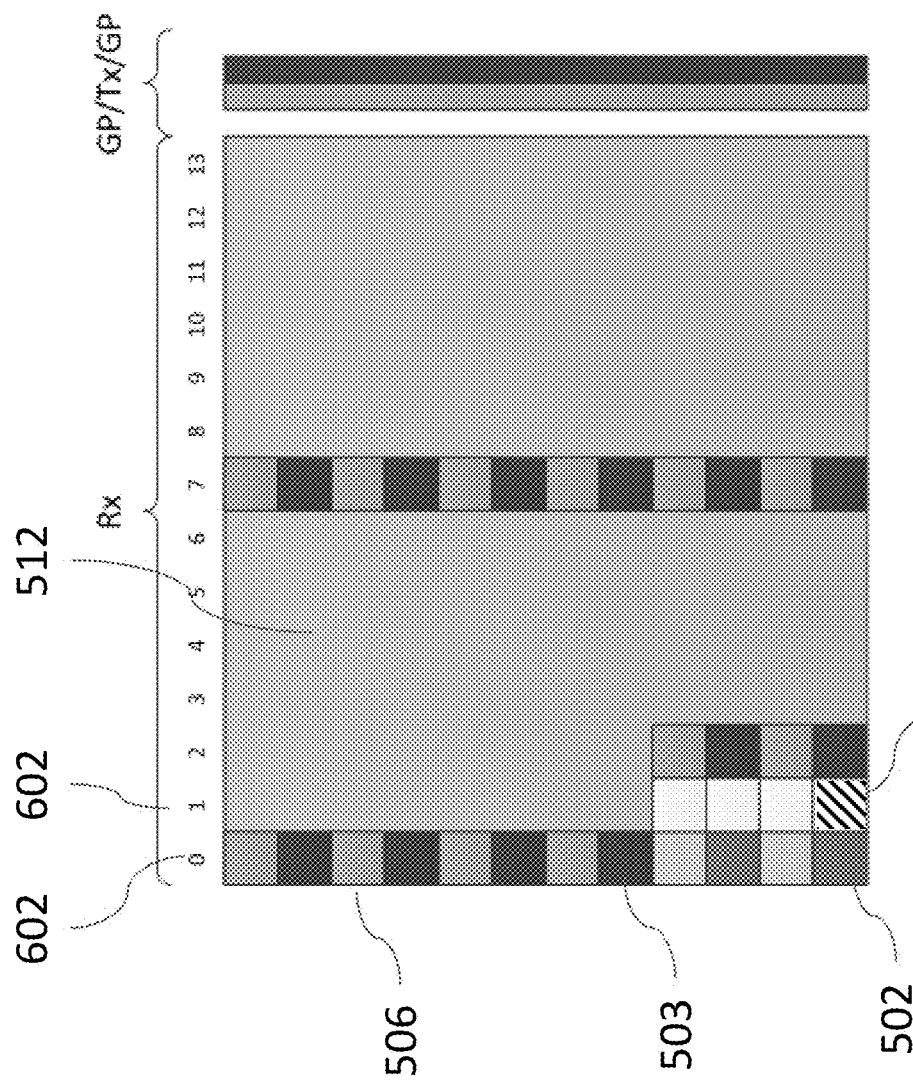
FIG. 6 is a block diagram illustrating an embodiment of a downlink transmission using two control channels to achieve a relaxed ACK/NACK processing time constraint in accordance with various aspects of the present disclosure.

FIG. 6 is a block diagram illustrating an embodiment of a downlink transmission using two control channels to achieve a relaxed ACK/NACK processing time constraint. This embodiment is similar to that of FIG. 5, with the exception that the pilot signals 503 are sparse density pilot signals. In this embodiment, the pilot signals 503 are sparse in the time domain. In this embodiment, during the first symbol period 602, because the pilot signals are sparse there is not an inherent guarantee that all REs 506 that are not occupied by PDCCH 502 will be occupied by pilot signals 503, and therefore data from RB 512 may be present in symbol period 602. If data is transmitted before the PDDICH 510 is transmitted during second symbol period 604, the UE 120 may not be prepared to receive it, since the PDDICH 510 contains the necessary information to inform UE 120 what data it will be receiving. Therefore, in this embodiment the REs 506 of first symbol period 602 that are not occupied by PDCCH 502 are scheduled to guarantee they are filled with non-data symbols, for example pilot signals 503, other control symbols, or even empty symbols.

Figure 7:
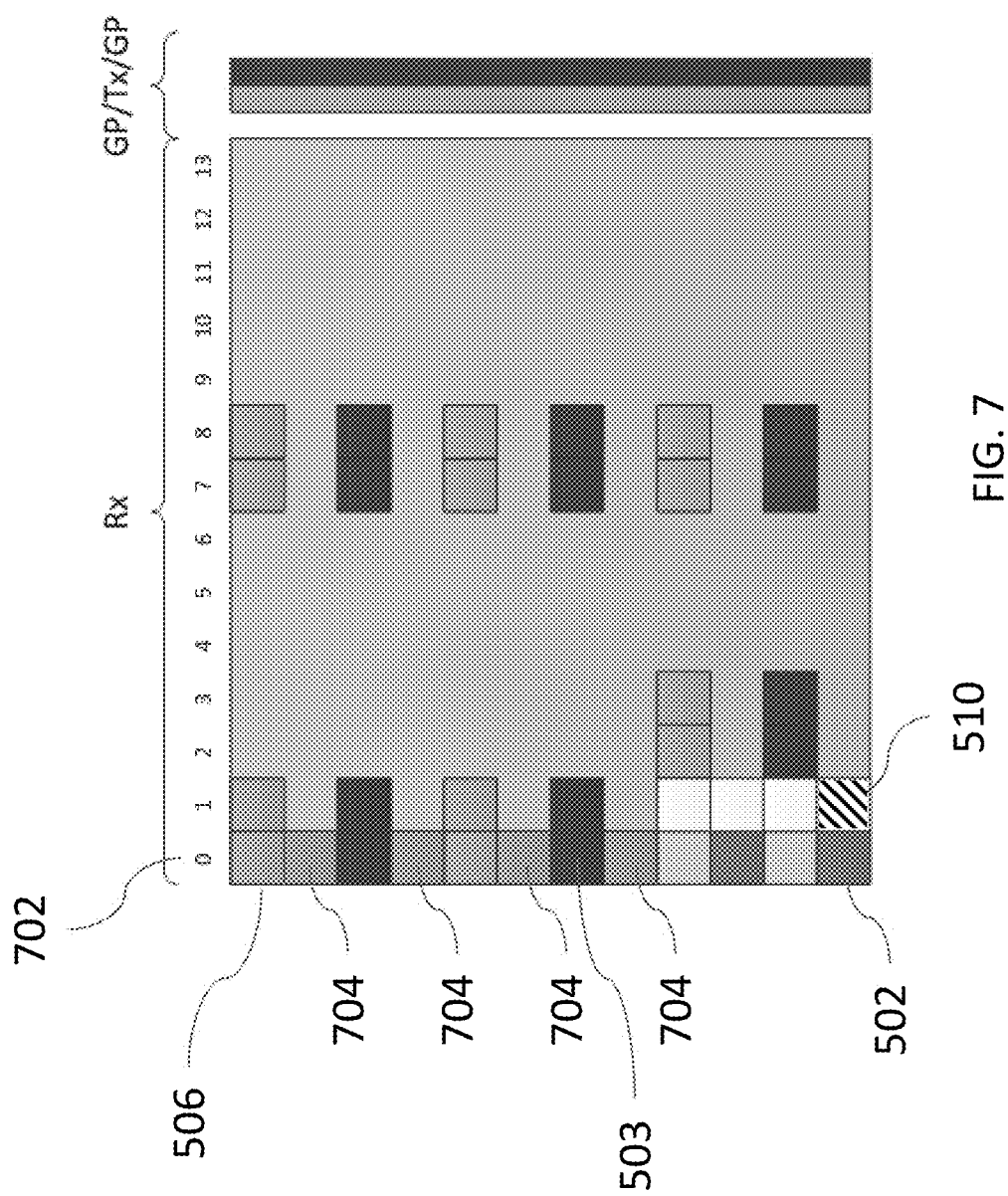
FIG. 7 is a block diagram illustrating an embodiment of a downlink transmission using two control channels to achieve a relaxed ACK/NACK processing time constraint in accordance with various aspects of the present disclosure.

FIG. 7 is a block diagram illustrating an embodiment of a downlink transmission using two control channels to achieve a relaxed ACK/NACK processing time constraint. In this embodiment, similar to that of FIG. 6, the pilot signals 503 are sparse density pilot signals. However, in this embodiment the pilot signals 503 are sparse in the frequency domain. Therefore, PDCCH 502 in combination with pilot signals 503 do not fill up all REs 506 symbol period 702. In other embodiments, the pilot signals 503 may be sparse in both the time and frequency domains. In this case, however, the base station 110 may schedule new data 704 in REs 506 that are in first symbol period 702, while the base station 110 is still decoding the ACK/NACK signal 414. In some embodiments, the PDCCH 502 will contain an MCS to indicate to the UE 120 that it can begin decoding the new data 704 immediately. When the base station 110 finishes decoding the ACK/NACK signal 414 at the end of first symbol period 702, if it determines that a NACK was sent and that old data 408 needs to be retransmitted, then PDDICH 510 may indicate to UE 120 that it should abort decoding new data 704 and prepare to receive retransmitted data 408. The indication to abort may be contained, for example, in the NDI within PDDICH 510. PDDICH 510 will also contain a new MCS corresponding to the retransmission data 408. If the ACK/NACK signal 414 decodes to be an ACK, then PDDICH 510 will not indicate to the UE 120 to abort decoding the new data 702, and new data 702 will continue to be transmitted.

Figure 8:
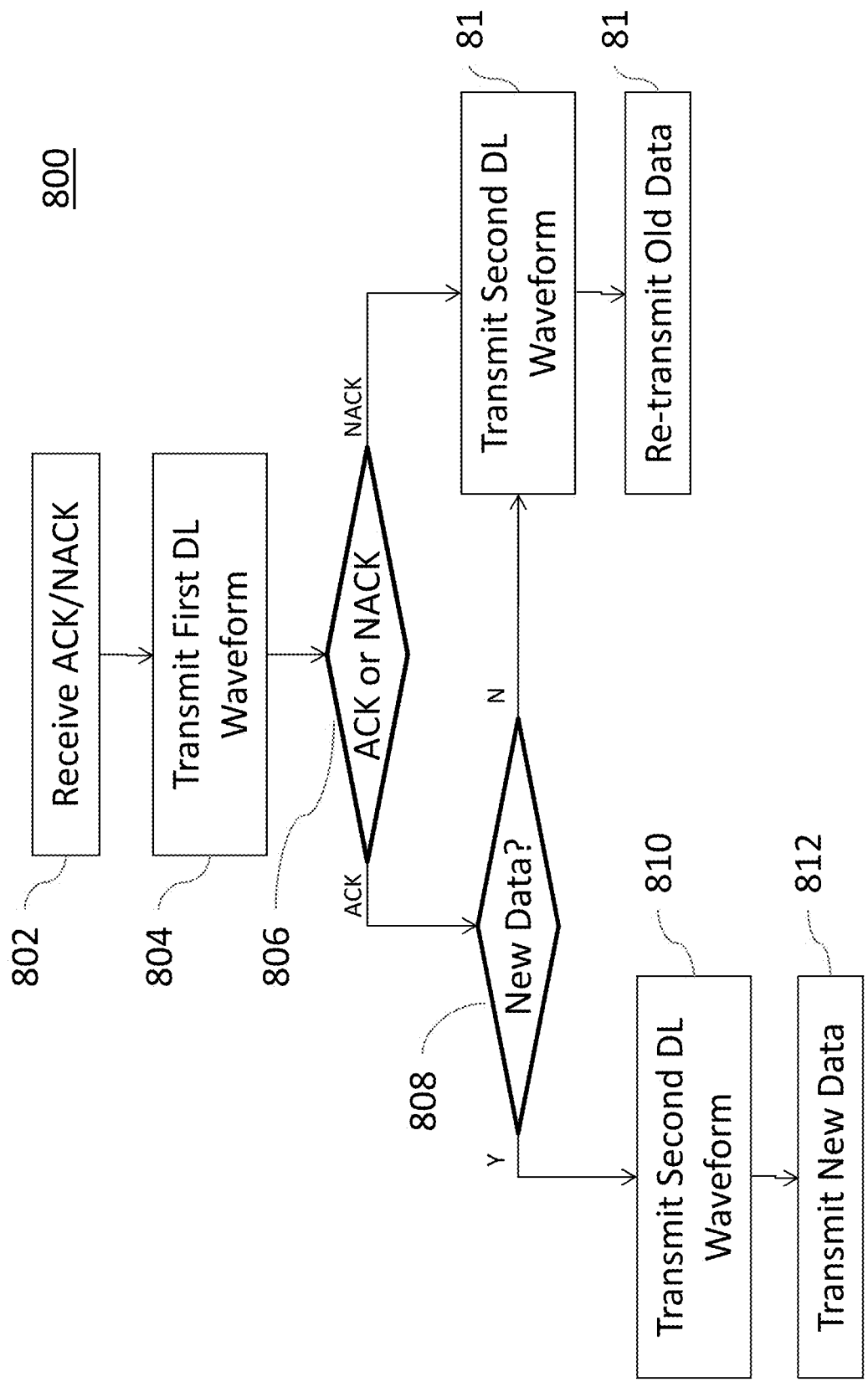
FIG. 8 is a flowchart illustrating a method of downlink communication from the viewpoint of a base station according to some embodiments of the system in accordance with various aspects of the present disclosure.

FIG. 8 is a flowchart illustrating a method 800 of downlink communication from the viewpoint of a base station 110 according to some embodiments of the system. Beginning at block 802, the base station 110 receives an ACK/NACK signal from a UE 120. For example, the base station 110 may receive the ACK/NACK during a receiving portion of a transmission time interval ($TTI_{n-1}$). Moving to block 804, the base station 110 transmits a first downlink (DL) waveform to the UE 120. For example, the base station 110 can transmit the first DL waveform during a control signal transmit portion of the transmission time interval ($TTI_n$) following receipt of the ACK/NACK from the UE 120. In some embodiments, the first DL waveform is a PDCCH that lacks the DDI. Decision blocks 806 and 808 can occur simultaneously with block 804, for example during the control signal transmit portion of $TTI_n$. Moving to decision block 806, the base station 110 determines whether the ACK/NACK signal is an ACK or a NACK. If the signal is an ACK, the method proceeds to decision block 808, where the base station 110 determines if it has any new data to send to UE 120. If so, the method proceeds to block 810, and the base station 110 transmits a second DL waveform to UE 120. For example, the base station 110 can transmit the second DL waveform during a later part of the control signal transmit portion of the $TTI_n$, following transmission of the first DL waveform. In some embodiments, the second DL waveform contains the DDI. Moving to block 812, the base station transmits new data to the UE 120. For example, the base station 110 can transmit the new data during a data transmit portion of the $TTI_n$ following transmission of the second DL waveform. Returning to decision block 808, if there is no new data, the method proceeds to block 814, where the base station 110 transmits a second DL waveform to UE 120. As noted in the description of block 810, the base station 110 can transmit the second DL waveform during a later part of the control signal transmit portion of the $TTI_n$. In some embodiments, the second DL waveform contains the DDI related to the re-transmission data to be sent. Moving to block 816, the base station 110 re-transmits old data to the UE 120. For example, the base station 110 can re-transmit the old data during the data transmit portion of the $TTI_n$ following transmission of the second DL waveform. Returning to decision block 806, if the ACK/NACK signal is a NACK, the method proceeds to block 814 and then to block 816, as described above. In some embodiments, blocks 804-816 occur during one TTI.

Figure 9:
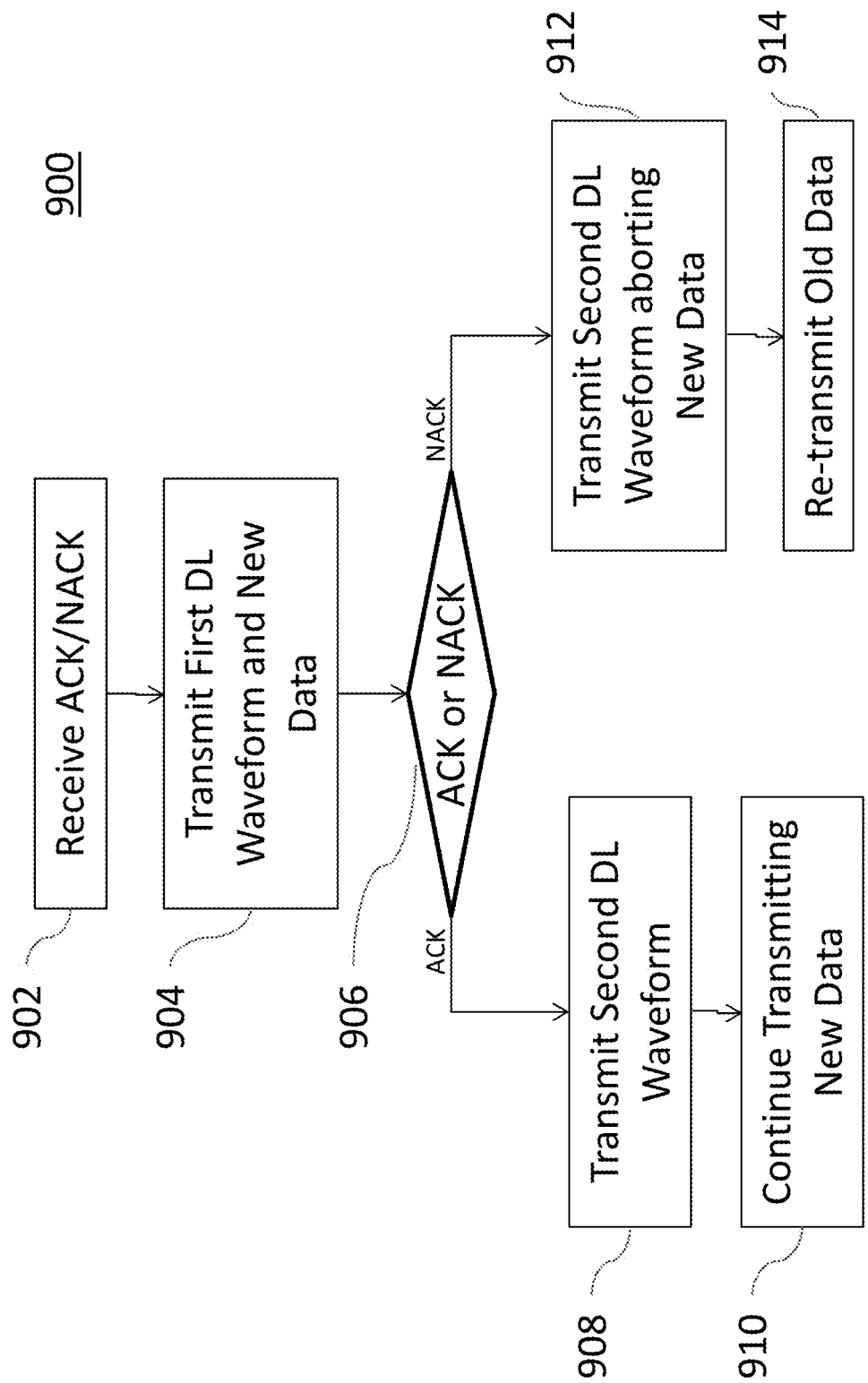
FIG. 9 is a flowchart illustrating a method of downlink communication from the viewpoint of a base station according to some embodiments of the system in accordance with various aspects of the present disclosure.

FIG. 9 is a flowchart illustrating a method 900 of downlink communication from the viewpoint of a base station 110 according to some embodiments of the system. Beginning at block 902, the base station 110 receives an ACK/NACK signal from a UE 120. For example, the base station 110 may receive the ACK/NACK during a receiving portion of a transmission time interval ($TTI_{n-1}$). Moving to block 904, the base station 110 transmits a first downlink (DL) waveform to the UE 120 and the base station 110 transmits new data to the UE 120. For example, the base station 110 can transmit the first DL waveform and the new data during a control signal transmit portion of the transmission time interval ($TTI_n$) following receipt of the ACK/NACK from the UE 120. In some embodiments, the first DL waveform is a PDCCH that lacks some of the DDI, but contains control information that allows the UE 120 to begin decoding the new data. Decision block 906 can occur simultaneously with block 904, for example during the control signal transmit portion of $TTI_n$. Moving to decision block 906, the base station 110 determines whether the ACK/NACK signal is an ACK or a NACK. If the signal is an ACK, the method proceeds to block 908, and the base station 110 transmits a second DL waveform to UE 120. For example, the base station 110 can transmit the second DL waveform during a later part of the control signal transmit portion of the $TTI_n$, following transmission of the first DL waveform. In some embodiments, the second DL waveform contains the DDI that is related to the new data to be sent. Moving to block 910, the base station continues transmitting new data to the UE 120. For example, the base station 110 can continue to transmit the new data during a data transmit portion of the $TTI_n$ following transmission of the second DL waveform. Returning to decision block 906, if the ACK/NACK signal is a NACK, the method proceeds to block 912, where the base station transmits a second DL waveform to UE 120, informing the UE 120 to abort its reception of the new data. As noted in the description of block 908, the base station 110 can transmit the second DL waveform during a later part of the control signal transmit portion of the $TTI_n$. In some embodiments, the second DL waveform contains the DDI that is related to the retransmission data to be sent. Moving to block 914, the base station 110 re-transmits old data to UE 120. For example, the base station 110 can re-transmit the old data during the data transmit portion of the $TTI_n$ following transmission of the second DL waveform. In some embodiments, blocks 904-914 occur during one TTI.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, from a first wireless communication device to a second wireless communication device, a first downlink control waveform during a first symbol period of a transmission time interval (TTI), the first downlink control waveform constructed without downlink data indicators;
transmitting, from the first wireless communication device to the second wireless communication device, a first data waveform in accordance with the first downlink control waveform that is decodable without the downlink data indicators;
transmitting, from the first wireless communication device to the second wireless communication device, a second downlink control waveform during a second symbol period of the TTI, the second symbol period being different than the first symbol period, and the second downlink control waveform constructed to include the downlink data indicators; and
transmitting, from the first wireless communication device to the second wireless communication device, a second data waveform in accordance with the second downlink control waveform.

2. The method of claim 1, wherein the first downlink control waveform does not include a new data indicator (NDI) or a redundancy version (RV).

3. The method of claim 1, wherein the downlink data indicators of the second downlink control waveform include a modulation and coding scheme (MCS), a new data indicator (NDI), and a redundancy version (RV).

4. The method of claim 1, wherein the second data waveform is transmitted after the second symbol period.

5. The method of claim 4, further comprising receiving, at the first wireless communication device, an ACK notification prior to transmitting the second downlink control waveform, wherein the first and second data waveforms comprise new data.

6. The method of claim 4, further comprising receiving, at the first wireless communication device, an ACK notification prior to transmitting the second downlink control waveform, wherein the second data waveform comprises retransmission data.

7. The method of claim 4, further comprising receiving, at the first wireless communication device, a NACK notification prior to transmitting the second downlink control waveform, wherein the second data waveform comprises retransmission data.

8. The method of claim 1, wherein the first and second data waveforms comprise new data.

9. The method of claim 8, further comprising:
receiving, at the first wireless communication device, an ACK notification prior to transmitting the second downlink control waveform; and
continuing transmission of the new data with the second data waveform after the first symbol period.

10. The method of claim 8, further comprising:
receiving, at the first wireless communication device, a NACK notification prior to transmitting the second downlink control waveform; and
changing, in response to the NACK notification, the second data waveform to retransmission data, wherein the transmitting the second data waveform comprises transmission of the retransmission data of the second data waveform after the first symbol period.

11. A method of wireless communication, comprising:
receiving, at a first wireless communication device from a second wireless communication device, a first downlink control waveform during a first symbol period of a transmission time interval (TTI), the first downlink control waveform constructed without downlink data indicators;
receiving, at the first wireless communication device from the second wireless communication device, a first data waveform in accordance with the first downlink control waveform that is decodable without the downlink data indicators;
receiving, at the first wireless communication device from the second wireless communication device, a second downlink control waveform during a second symbol period of the TTI, the second symbol period being different than the first symbol period, and the second downlink control waveform constructed to include the downlink data indicators; and
receiving, at the first wireless communication device from the second wireless communication device, a second data waveform in accordance with the second downlink control waveform.

12. The method of claim 11, wherein the first downlink control waveform does not include a new data indicator (NDI) or a redundancy version (RV).

13. The method of claim 11, wherein the downlink data indicators of the second downlink control waveform include a modulation and coding scheme (MCS), a new data indicator (NDI), and a redundancy version (RV).

14. The method of claim 11, wherein the second data waveform is received after the second symbol period.

15. The method of claim 14, further comprising transmitting, from the first wireless communication device to the second wireless communication device, an ACK notification prior to receiving the second downlink control waveform, wherein the first and second data waveforms comprise new data.

16. The method of claim 14, further comprising transmitting, from the first wireless communication device to the second wireless communication device, an ACK notification prior to receiving the second downlink control waveform, wherein the second data waveform comprises retransmission data.

17. The method of claim 14, further comprising transmitting, from the first wireless communication device to the second wireless communication device, a NACK notification prior to receiving the second downlink control waveform, wherein the second data waveform comprises retransmission data.

18. The method of claim 11, wherein the first and second data waveforms comprise new data.

19. The method of claim 18, further comprising:
transmitting, from the first wireless communication device to the second wireless communication device, an ACK notification prior to receiving the second downlink control waveform; and
continuing reception of the new data with the second data waveform after the first symbol period.

20. The method of claim 18, further comprising:
transmitting, from the first wireless communication device to the second wireless communication device, a NACK notification prior to receiving the second downlink control waveform; and
continuing reception of the second data waveform after the first symbol period, wherein the second data waveform is received after the first symbol period has been changed to retransmission data.

21. A first wireless communication device, comprising:
a transceiver configured to:
transmit, to a second wireless communication device, a first downlink control waveform during a first symbol period of a transmission time interval (TTI), the first downlink control waveform constructed without downlink data indicators;
transmit, to the second wireless communication device, a first data waveform in accordance with the first downlink control waveform that is decodable without the downlink data indicators;
transmit, to the second wireless communication device, a second downlink control waveform during a second symbol period of the TTI, the second symbol period being different than the first symbol period, and the second downlink control waveform constructed to include the downlink data indicators; and
transmit, to the second wireless communication device, a second data waveform in accordance with the second downlink control waveform.

22. The first wireless communication device of claim 21, wherein the first downlink control waveform does not include a new data indicator (NDI) or a redundancy version (RV).

23. The first wireless communication device of claim 21, wherein the downlink data indicators of the second downlink control waveform include a modulation and coding scheme (MCS), a new data indicator (NDI), and a redundancy version (RV).

24. The first wireless communication device of claim 21, wherein the second data waveform is transmitted after the second symbol period.

25. The first wireless communication device of claim 24, wherein the transceiver is further configured to receive, at the first wireless communication device, an ACK notification prior to transmitting the second downlink control waveform, and wherein the first and second data waveforms comprise new data.

26. The first wireless communication device of claim 24, wherein the transceiver is further configured to receive, at the first wireless communication device, an ACK notification prior to transmitting the second downlink control waveform, and wherein the second data waveform comprises retransmission data.

27. The first wireless communication device of claim 24, wherein the transceiver is further configured to receive, at the first wireless communication device, a NACK notification prior to transmitting the second downlink control waveform, and wherein the second data waveform comprises retransmission data.

28. The first wireless communication device of claim 21, wherein the first and second data waveforms comprise new data.

29. The first wireless communication device of claim 28, further comprising:
the transceiver further configured to receive, at the first wireless communication device, an ACK notification prior to transmitting the second downlink control waveform; and
the transceiver further configured to continue transmission of the new data with the second data waveform after the first symbol period.

30. The first wireless communication device of claim 28, further comprising:
the transceiver further configured to receive, at the first wireless communication device, a NACK notification prior to transmitting the second downlink control waveform;
a processor configured to change, in response to the NACK notification, the second data waveform to retransmission data; and
the transceiver further configured to transmit the retransmission data of the second data waveform after the first symbol period.

31. A first wireless communication device, comprising:
a transceiver configured to:
receive, from a second wireless communication device, a first downlink control waveform during a first symbol period of a transmission time interval (TTI), the first downlink control waveform constructed without downlink data indicators;
receive, from the second wireless communication device, a first data waveform in accordance with the first downlink control waveform that is decodable without the downlink data indicators;
receive, from the second wireless communication device, a second downlink control waveform during a second symbol period of the TTI, the second symbol period being different than the first symbol period, and the second downlink control waveform constructed to include the downlink data indicators; and
receive, from the second wireless communication device, a second data waveform in accordance with the second downlink control waveform.

32. The first wireless communication device of claim 31, wherein the first downlink control waveform does not include a new data indicator (NDI) or a redundancy version (RV).

33. The first wireless communication device of claim 31, wherein the downlink data indicators of the second downlink control waveform include a modulation and coding scheme (MCS), a new data indicator (NDI), and a redundancy version (RV).

34. The first wireless communication device of claim 31, wherein the second data waveform is received after the second symbol period.

35. The first wireless communication device of claim 34, wherein the transceiver is further configured to transmit, from the first wireless communication device to the second wireless communication device, an ACK notification prior to receiving the second downlink control waveform, wherein the first and second data waveforms comprise new data.

36. The first wireless communication device of claim 34, wherein the transceiver is further configured to transmit, from the first wireless communication device to the second wireless communication device, an ACK notification prior to receiving the second downlink control waveform, wherein the second data waveform comprises retransmission data.

37. The first wireless communication device of claim 34, wherein the transceiver is further configured to transmit, from the first wireless communication device to the second wireless communication device, a NACK notification prior to receiving the second downlink control waveform, wherein the second data waveform comprises retransmission data.

38. The first wireless communication device of claim 31, wherein the first and second data waveforms comprise new data.

39. The first wireless communication device of claim 38, further comprising:
the transceiver further configured to transmit, to the second wireless communication device, an ACK notification prior to receiving the second downlink control waveform; and
the transceiver further configured to continue reception of the new data with the second data waveform after the first symbol period.

40. The first wireless communication device of claim 38, further comprising:
the transceiver further configured to transmit, to the second wireless communication device, a NACK notification prior to receiving the second downlink control waveform; and
the transceiver further configured to continue reception of the second data waveform after the first symbol period, wherein the second data waveform is received after the first symbol period has been changed to retransmission data.

41. A first wireless communication device, comprising:
means for transmitting to a second wireless communication device a first downlink control waveform during a first symbol period of a transmission time interval (TTI), the first downlink control waveform constructed without downlink data indicators;
means for transmitting to the second wireless communication device a first data waveform in accordance with the first downlink control waveform that is decodable without the downlink data indicators;
means for transmitting to the second wireless communication device a second downlink control waveform during a second symbol period of the TTI, the second symbol period being different than the first symbol period, and the second downlink control waveform constructed to include the downlink data indicators; and
means for transmitting to the second wireless communication device a second data waveform in accordance with the second downlink control waveform.

42. The first wireless communication device of claim 41, wherein the first downlink control waveform does not include a new data indicator (NDI) or a redundancy version (RV).

43. The first wireless communication device of claim 41, wherein the downlink data indicators of the second downlink control waveform include a modulation and coding scheme (MCS), a new data indicator (NDI), and a redundancy version (RV).

44. The first wireless communication device of claim 41, wherein the second data waveform is transmitted after the second symbol period.

45. The first wireless communication device of claim 44, further comprising means for receiving, at the first wireless communication device, an ACK notification prior to transmitting the second downlink control waveform, wherein the first and second data waveforms comprise new data.

46. The first wireless communication device of claim 44, further comprising means for receiving, at the first wireless communication device, an ACK notification prior to transmitting the second downlink control waveform, wherein the second data waveform comprises retransmission data.

47. The first wireless communication device of claim 44, further comprising means for receiving, at the first wireless communication device, a NACK notification prior to transmitting the second downlink control waveform, wherein the second data waveform comprises retransmission data.

48. The first wireless communication device of claim 41, wherein the first and second data waveforms comprise new data.

49. The first wireless communication device of claim 48, further comprising:
means for receiving, at the first wireless communication device, an ACK notification prior to transmitting the second downlink control waveform; and
means for continuing transmission of the new data with the second data waveform after the first symbol period.

50. The first wireless communication device of claim 48, further comprising:
means for receiving, at the first wireless communication device, a NACK notification prior to transmitting the second downlink control waveform; and
means for changing, in response to the NACK notification, the second data waveform to retransmission data, wherein the means for transmitting the second data waveform comprises transmission of the retransmission data of the second data waveform after the first symbol period.

51. A first wireless communication device, comprising:
means for receiving, at the first wireless communication device from a second wireless communication device, a first downlink control waveform during a first symbol period of a transmission time interval (TTI), the first downlink control waveform constructed without downlink data indicators;
means for receiving, at the first wireless communication device from the second wireless communication device, a first data waveform in accordance with the first downlink control waveform that is decodable without the downlink data indicators;
means for receiving, at the first wireless communication device from the second wireless communication device, a second downlink control waveform during a second symbol period of the TTI, the second symbol period being different than the first symbol period, and the second downlink control waveform constructed to include the downlink data indicators; and
means for receiving, at the first wireless communication device from the second wireless communication device, a second data waveform in accordance with the second downlink control waveform.

52. The first wireless communication device of claim 51, wherein the first downlink control waveform does not include a new data indicator (NDI) or a redundancy version (RV).

53. The first wireless communication device of claim 51, wherein the downlink data indicators of the second downlink control waveform include a modulation and coding scheme (MCS), a new data indicator (NDI), and a redundancy version (RV).

54. The first wireless communication device of claim 51, wherein the second data waveform is received after the second symbol period.

55. The first wireless communication device of claim 54, further comprising means for transmitting, from the first wireless communication device to the second wireless communication device, an ACK notification prior to receiving the second downlink control waveform, wherein the first and second data waveforms comprise new data.

56. The first wireless communication device of claim 54, further comprising means for transmitting, from the first wireless communication device to the second wireless communication device, an ACK notification prior to receiving the second downlink control waveform, wherein the second data waveform comprises retransmission data.

57. The first wireless communication device of claim 54, further comprising means for transmitting, from the first wireless communication device to the second wireless communication device, a NACK notification prior to receiving the second downlink control waveform, wherein the second data waveform comprises retransmission data.

58. The first wireless communication device of claim 51, wherein the data waveforms comprise new data.

59. The first wireless communication device of claim 58, further comprising:
means for transmitting, from the first wireless communication device to the second wireless communication device, an ACK notification prior to receiving the second downlink control waveform; and
means for continuing reception of the new data with the second data waveform after the first symbol period.

60. The first wireless communication device of claim 58, further comprising:
means for transmitting, from the first wireless communication device to the second wireless communication device, a NACK notification prior to receiving the second downlink control waveform; and
means for continuing reception of the second data waveform after the first symbol period, wherein the second data waveform is received after the first symbol period has been changed to retransmission data.

61. A non-transitory computer-readable medium having program code recorded thereon, the program code, when executed by a processor in a first wireless communication device, comprising:
code for causing the first wireless communication device to transmit to a second wireless communication device a first downlink control waveform during a first symbol period of a transmission time interval (TTI), the first downlink control waveform constructed without downlink data indicators;
code for causing the first wireless communication device to transmit to the second wireless communication device a first data waveform in accordance with the first downlink control waveform that is decodable without the downlink data indicators;
code for causing the first wireless communication device to transmit to the second wireless communication device a second downlink control waveform during a second symbol period of the TTI, the second symbol period being different than the first symbol period, and the second downlink control waveform constructed to include the downlink data indicators; and
code for causing the first wireless communication device to transmit to the second wireless communication device a second data waveform in accordance with the second downlink control waveform.

62. The non-transitory computer-readable medium of claim 61, wherein the first downlink control waveform does not include a new data indicator (NDI) or a redundancy version (RV).

63. The non-transitory computer-readable medium of claim 61, wherein the downlink data indicators of the second downlink control waveform include a modulation and coding scheme (MCS), a new data indicator (NDI), and a redundancy version (RV).

64. The non-transitory computer-readable medium of claim 61, wherein the second data waveform is transmitted after the second symbol period.

65. The non-transitory computer-readable medium of claim 64, the program code, when executed by the processor in the first wireless communication device, further comprising code for causing the first wireless communication device to receive an ACK notification prior to transmitting the second downlink control waveform, wherein the first and second data waveforms comprise new data.

66. The non-transitory computer-readable medium of claim 64, the program code, when executed by the processor in the first wireless communication device, further comprising code for causing the first wireless communication device to receive an ACK notification prior to transmitting the second downlink control waveform, wherein the second data waveform comprises retransmission data.

67. The non-transitory computer-readable medium of claim 64, the program code, when executed by the processor in the first wireless communication device, further comprising code for causing the first wireless communication device to receive a NACK notification prior to transmitting the second downlink control waveform, wherein the second data waveform comprises retransmission data.

68. The non-transitory computer-readable medium of claim 61, wherein the first and second data waveforms comprise new data.

69. The non-transitory computer-readable medium of claim 68, the program code, when executed by the processor in the first wireless communication device, further comprising:
code for causing the first wireless communication device to receive an ACK notification prior to transmitting the second downlink control waveform; and
code for causing the first wireless communication device to continue transmission of the new data with the second data waveform after the first symbol period.

70. The non-transitory computer-readable medium of claim 68, the program code, when executed by the processor in the first wireless communication device, further comprising:
code for causing the first wireless communication device to receive a NACK notification prior to transmitting the second downlink control waveform; and
code for causing the first wireless communication device to change, in response to the NACK notification, the second data waveform to retransmission data, wherein the transmission of the second data waveform after the first symbol period comprises the retransmission data.

71. A non-transitory computer-readable medium having program code recorded thereon, the program code, when executed by a processor in a first wireless communication device, comprising:
code for causing the first wireless communication device to receive, from a second wireless communication device, a first downlink control waveform during a first symbol period of a transmission time interval (TTI), the first downlink control waveform constructed without downlink data indicators;
code for causing the first wireless communication device to receive, from the second wireless communication device, a first data waveform in accordance with the first downlink control waveform that is decodable without the downlink data indicators;

code for causing the first wireless communication device to receive, from the second wireless communication device, a second downlink control waveform during a second symbol period of the TTI, the second symbol period being different than the first symbol period, and the second downlink control waveform constructed from the downlink data indicators; and code for causing the first wireless communication device to receive, from the second wireless communication device, a second data waveform in accordance with the second downlink control waveform.

72. The non-transitory computer-readable medium of claim 71, wherein the first downlink control waveform does not include a new data indicator (NDI) or a redundancy version (RV).

73. The non-transitory computer-readable medium of claim 71, wherein the downlink data indicators of the second downlink control waveform include a modulation and coding scheme (MCS), a new data indicator (NDI), and a redundancy version (RV).

74. The non-transitory computer-readable medium of claim 71, wherein the second data waveform is received after the second symbol period.

75. The non-transitory computer-readable medium of claim 71, the program code, when executed by the processor in the first wireless communication device, further comprising code for causing the first wireless communication device to transmit to the second wireless communication device an ACK notification prior to receiving the second downlink control waveform, wherein the first and second data waveforms comprise new data.

76. The non-transitory computer-readable medium of claim 71, the program code, when executed by the processor in the first wireless communication device, further comprising code for causing the first wireless communication device to transmit to the second wireless communication device an ACK notification prior to receiving the second downlink control waveform, wherein the second data waveform comprises retransmission data.

77. The non-transitory computer-readable medium of claim 71, the program code, when executed by the processor in the first wireless communication device, further comprising code for causing the first wireless communication device to transmit to the second wireless communication device a NACK notification prior to receiving the second downlink control waveform, wherein the second data waveform comprises retransmission data.

78. The non-transitory computer-readable medium of claim 71, wherein the first and second data waveforms comprise new data.

79. The non-transitory computer-readable medium of claim 78, the program code, when executed by the processor in the first wireless communication device, further comprising:

code for causing the first wireless communication device to transmit to the second wireless communication device an ACK notification prior to receiving the second downlink control waveform; and code for causing the first wireless communication device to continue reception of the new data with the second data waveform after the first symbol period.

80. The non-transitory computer-readable medium of claim 78, the program code, when executed by the processor in the first wireless communication device, further comprising:

code for causing the first wireless communication device to transmit to the second wireless communication device a NACK notification prior to receiving the second downlink control waveform; and code for causing the first wireless communication device to continue reception of the second data waveform after the first symbol period, wherein the second data waveform received after the first symbol period has been changed to retransmission data.

81. The method of claim 1, wherein the first data waveform comprises non-data symbols.

82. The method of claim 11, wherein the first data waveform comprises non-data symbols.

83. The first wireless communication device of claim 21, wherein the first data waveform comprises non-data symbols.

84. The first wireless communication device of claim 31, wherein the first data waveform comprises non-data symbols.

85. The first wireless communication device of claim 41, wherein the first data waveform comprises non-data symbols.

86. The first wireless communication device of claim 51, wherein the first data waveform comprises non-data symbols.

87. The non-transitory computer-readable medium of claim 61, wherein the first data waveform comprises non-data symbols.

88. The non-transitory computer-readable medium of claim 71, wherein the first data waveform comprises non-data symbols.

* * * * *